United States Patent
Balestri et al.

(10) Patent No.: US 10,152,646 B2
(45) Date of Patent: Dec. 11, 2018

(54) KEYPOINT IDENTIFICATION

(71) Applicant: TELECOM ITALIA S.p.A., Milan (IT)

(72) Inventors: Massimo Balestri, Turin (IT); Gianluca Francini, Turin (IT); Skjalg Lepsoy, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 108 days.

(21) Appl. No.: 14/906,218

(22) PCT Filed: Jul. 23, 2014

(86) PCT No.: PCT/EP2014/065808
§ 371 (c)(1),
(2) Date: Jan. 19, 2016

(87) PCT Pub. No.: WO2015/011185
PCT Pub. Date: Jan. 29, 2015

(65) Prior Publication Data
US 2016/0155014 A1  Jun. 2, 2016

(30) Foreign Application Priority Data

Jul. 24, 2013  (IT) .............................. MI2013A1244

(51) Int. Cl.
*G06K 9/00* (2006.01)
*G06K 9/46* (2006.01)

(52) U.S. Cl.
CPC ......... *G06K 9/4671* (2013.01); *G06K 9/4609* (2013.01); *G06K 9/4652* (2013.01)

(58) Field of Classification Search
None
See application file for complete search history.

(56) References Cited

PUBLICATIONS

Ng, Jeffrey, et al., "Steering in Scale Space to Optimally Detect Image Structures". Apr. 22, 2004. Computer Vision—ECCV 2004; pp. 482-494. XP019005798.*
Lowe, David G., "Distinctive Image Features from Scale-Invariant Keypoints", International Journal of Computer Vision, vol. 60, No. 2, Nov. 1, 2004, pp. 91-110, XP019216426.*

(Continued)

*Primary Examiner* — Fred Hu
(74) *Attorney, Agent, or Firm* — Oblon, McClelland, Maier & Neustadt, L.L.P.

(57) ABSTRACT

A method for identifying keypoints in a digital image including a set of pixels. Each pixel has associated thereto a respective value of an image representative parameter. The method includes approximating a filtered image. The filtered image depends on a filtering parameter and includes for each pixel of the image a filtering function that depends on the filtering parameter to calculate a filtered value of the value of the representative parameter of the pixel. The approximating includes: a) generating a set of base filtered images; each base filtered image is the image filtered with a respective value of the filtering parameter; b) for each pixel of at least a subset of the set of pixels, approximating the filtering function by a respective approximation function based on the base filtered images; the approximation function is a function of the filtering parameter within a predefined range of the filtering parameter.

14 Claims, 16 Drawing Sheets

(56) References Cited

PUBLICATIONS

Perona, Pietro, "Deformable Kernels For Early Vision" IEEE Transactions On Pattern Analysis and Machine Intelligence, vol. 17, Jan. 1, 1991, pp. 438-499, XP055108188.
Tuytelaars, Time, et al., "Loud Invariant Feature Detectors: A Survey" Foundations and Trends in Computer Graphics and Vision, vol. 3, No. 3, Jan. 1, 2008, pp. 177-280, XP002616097.
International Search Report and Written Opinion dated Dec. 8, 2014 for PCT/EP2014/065808 filed on Jul. 23, 2014.

\* cited by examiner

KEYPOINT IDENTIFICATION

BACKGROUND OF THE INVENTION

Field of the Invention

The present invention relates to the field of the analysis of images.

Description of the Prior Art

In the field of image analysis, before submitting an image formed by a plurality of points (pixels)—each characterized by a respective value of a physical parameter representative of the image, such as the luminance—to some types of processing—such as the comparison with another image—, it is advantageous to perform the identification of the position and size of the salient details represented in this image. In the field of image analysis, with "salient detail" of an image it is intended a portion of an object included in the image that is easily detectable even in the presence of changes in the point of view of the same object, in the lighting and in the type of camera.

Until a few years ago, it was possible to identify the position of the salient details of an image, but not their size. More in detail, the identification of the location of a salient detail of an image is performed through the identification of an associated salient point of the image—in the jargon, keypoint—, which substantially corresponds to the center of the salient detail. In the case of a detail having a circular shape, the keypoint coincides with the center of the detail, while in the case of details having different shapes, the position of the keypoint may diverge from the actual center of the detail.

Recently, in addition to image keypoint identification, procedures have been developed, thanks to which it is also possible to determine the size of the salient detail associated with each keypoint.

Currently, the methods used to identify the position and size of the salient details are based on the concept of "scale-space", which provides for the application of a series of gradually more intense filterings to the image. The filterings applied to the image are typically filterings that perform differential operations on values of the physical parameters (e.g., luminance) of the image points. Typically, such filterings are based on the Gaussian function, the filtering intensity of which is governed by a filtering parameter $\sigma$ (the standard deviation of the Gaussian function): the higher the filtering parameter $\sigma$ is, the flatter and wider the Gaussian is, and a more intense smoothing effect the Gaussian has. The scale-space of an image formed by a matrix of pixels of coordinates (x, y) is the space formed by the set of filtered images (in terms of luminance) obtained from the starting image applying gradually more intense filters—i.e. with gradually larger values of $\sigma$—and is therefore a three dimensions (x, y, $\sigma$) space.

The theory (see for example T. Lindeberg (1992), "Scale-space behavior of local extrema and blobs", J. of Mathematical Imaging and Vision, 1 (1), pages 65-99) states that if you have an extreme value—with respect to $\sigma$—of the filtered image for a point $(x_p, y_p, \sigma_p)$ belonging to the space (x, y, $\sigma$), i.e., a maximum or a minimum—with respect to $\sigma$—in a portion of the space (x, y, $\sigma$) surrounding the point $(x_p, y_p, \sigma_p)$, then that point is associated with a salient detail, whose center coordinates are $(x_p, y_p)$, and the size is proportional to $\sigma_p$. The size (diameter) of the detail (in units or pixels) is equal to $2*sqrt(2)*\sigma_p$.

By identifying all the extreme points in the scale-space, the position and size of the salient details in the image it is therefore obtained.

To find the extreme points in scale-space, known methods (such as the method that uses the descriptor "Scale-Invariant Feature Transform", SIFT, described in the 1999 in the article *Object recognition from local scale-invariant features* of Lowe, David G., *Proceedings of the International Conference on Computer Vision* 2. pages 1150 to 1157 and the subject of U.S. Pat. No. 6,711,293), consider a sequence of filtered images with increasing values of $\sigma$, and, for each point of an image filtered with a $\sigma$, compare their values with the values of the eight adjacent points of the same image and the values of the 18 (9+9) adjacent points present in the filtered images corresponding to the previous and next values of $\sigma$ in the sequence. If this point is less than or greater than all the adjacent ones, then the point is an extreme of the space x, y, $\sigma$, and is a candidate to be a keypoint. This point is just a candidate because it is known (see, for example Lowe, D G, "Distinctive Image Features from Scale-Invariant Keypoints", International Journal of Computer Vision, 60, 2, pages 91-110, 2004) to eliminate the points corresponding to portions of the image having low contrast and the points that lie on structures similar to edges, since the location of a detail along an edge can easily vary in different images that depict the same scene. The point is therefore not reliable and is therefore discarded.

SUMMARY OF THE INVENTION

The Applicant has noticed that the approaches known in the state of the art for the identification of the keypoints of an image use a limited subset of values of $\sigma$ to filter the image obtaining only a discrete representation of the filtered image as $\sigma$ varies.

The Applicant has however observed that in order to identify more precisely and effectively the keypoints of an image, while reducing the amount of required calculations, it is possible to approximate the generic filtered image so as to represent it with continuity with respect to $\sigma$, and not only relatively to a small set of discrete values of this parameter.

An aspect of the present invention refers to a method for identifying keypoints in a digital image comprising a set of pixels. Each pixel has associated thereto a respective value of an image representative parameter. Said method comprises approximating a filtered image. Said filtered image depend on a filtering parameter and comprises for each pixel of the image a filtering function that depends on the filtering parameter to calculate a filtered value of the value of the representative parameter of the pixel. Said approximating comprises:

a) generating a set of base filtered images; each base filtered image is the image filtered with a respective value of the filtering parameter;

b) for each pixel of at least a subset of said set of pixels, approximating the filtering function by means of a respective approximation function based on the base filtered images; said approximation function is a function of the filtering parameter within a predefined range of the filtering parameter;

The method further comprises, for each pixel of said subset, identifying such pixel as a keypoint candidate if the approximation function has a local extreme which is also a global extreme with respect to the filtering parameter in a respective sub-range internal to said predefined range.

For each pixel identified as a candidate keypoint, the method further comprises:

c) comparing the value assumed by the approximation function at the value of the filtering parameter corresponding to the global extreme of the pixel with the values assumed by the approximation functions of the adjacent pixels in the image at the values of the filtering parameters of the respective global extremes of such adjacent pixels, and d) selecting such pixel based on this comparison.

According to an embodiment of the present invention, said approximating the filtering function by means of a respective approximation function based on the base filtered images comprises calculating said approximation function based on a linear combination of said base filtered images.

According to an embodiment of the present invention, said approximation function is based on a further approximation of said linear combination of said base filtered images.

According to an embodiment of the present invention, said approximation function is a polynomial having the filtering parameter as a variable.

According to an embodiment of the present invention, the coefficients of said polynomial are calculated based on the base filtered images and based on an approximation of weights of said linear combination.

According to an embodiment of the present invention, the method further comprises discarding from the selected pixels the pixels wherein the value assumed by the approximation function at the filtering parameter corresponding to the global extreme of the pixel has an absolute value smaller than a first threshold.

According to an embodiment of the present invention, the method further comprises:

for each selected pixel, calculating the main curvature and the secondary curvature of the surface formed by the filtering functions in the pixels of the image contained in a patch centered at such selected pixel;

discarding/maintaining such pixel from/in the selected pixels based on the ratio between the main curvature and the secondary curvature.

According to an embodiment of the present invention, the method further comprises:

for each selected pixel, calculating the value assumed by the second derivative of the approximation function with respect to the filtering parameter at the corresponding global extreme, and discarding/maintaining such pixel from/in the selected pixels based on such value assumed by the second derivative.

According to an embodiment of the present invention, said identifying keypoint is further repeated on at least a scaled version of the image, using the same predefined range of the filtering parameter.

According to an embodiment of the present invention:

at least one of the values of the filtering parameter of the base filtered images is equal to twice the lowest among the values of the filtering parameter of the other base filtered images;

said scaled version of the image is obtained by approximating the base filtered images starting from an approximate version of the base filtered image having the lowest value of the filtering parameter, said approximate version of the base filtered image is approximated by undersampling the base filtered image with such value of the filtering parameter that is twice the lowest value of the filtering parameter.

According to an embodiment of the present invention, said filtered image is based on the application of filters based on Laplacian of Gaussians or filters based on Differences of Gaussians, and said filtering parameter is the standard deviation of the Gaussian function.

According to an embodiment of the present invention, said polynomial is a third degree polynomial with respect to the filtering parameter.

According to an embodiment of the present invention, each pixel of the image has at least one corresponding coordinate that identifies the location of the pixels in the image; said method further comprises for each selected pixel modifying said at least one coordinate of such pixel by calculating a corresponding change of coordinates based on a further approximation function that approximates the filtering function in the pixel with respect to such a change of coordinates; said further approximation function is based:

1) on the filtering function of such selected pixel at the value of the filtering parameter corresponding to the global extreme of the selected pixel, and 2) on the filtering functions of the pixels adjacent to the selected pixel in the image at the value of the filtering parameter corresponding to the global extreme of the selected pixel.

According to an embodiment of the present invention, said calculating the change of coordinates comprises identifying maximum or minimum points in the further approximation function with respect to the change of coordinates and setting such change of coordinates based on the identified maximum or minimum points.

BRIEF DESCRIPTION OF DRAWINGS

These and further features and advantages of the present invention will be made apparent from the following description of some embodiments by way of example and not of limitation, to be read in conjunction with the accompanying drawings, in which.

DETAILED DESCRIPTION OF EXEMPLARY EMBODIMENTS OF THE INVENTION

Typically, the filter based on the Gaussian function which is applied to the images may be a Laplacian of Gaussian ("Laplacian Of Gaussian", LoG) or a difference of Gaussians ("Difference Of Gaussian" DoG). The difference of Gaussians approximates the Laplacian of Gaussian, but it may be convenient to adopt for computational reasons. Consequently, although in this paper reference will be always made to operations using LoG filters, equivalent considerations apply in the case of DoG filters.

Figure 1A:
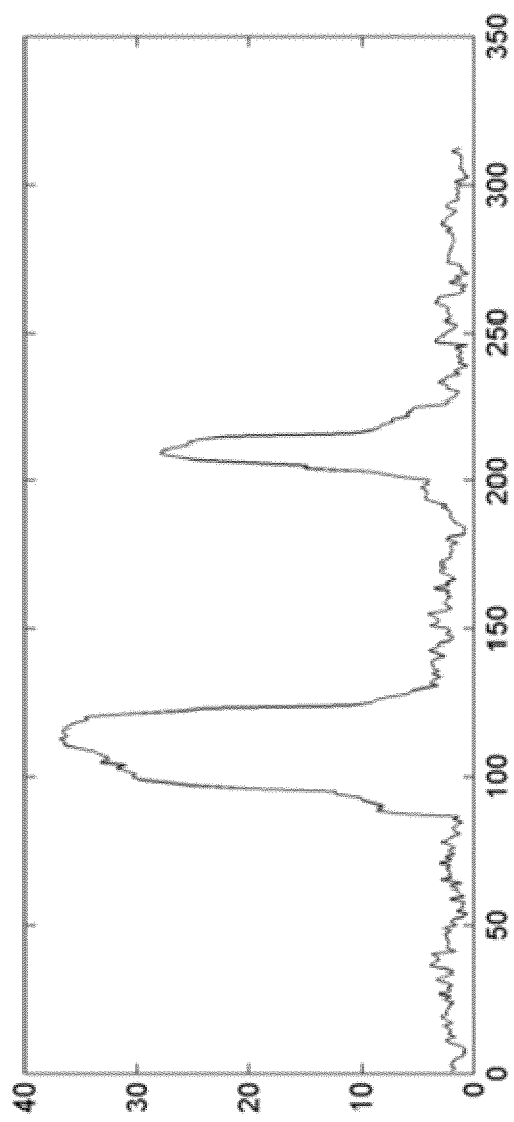
FIG. 1A is a graph showing a luminance signal as a function of a coordinate.
Figure 1B:
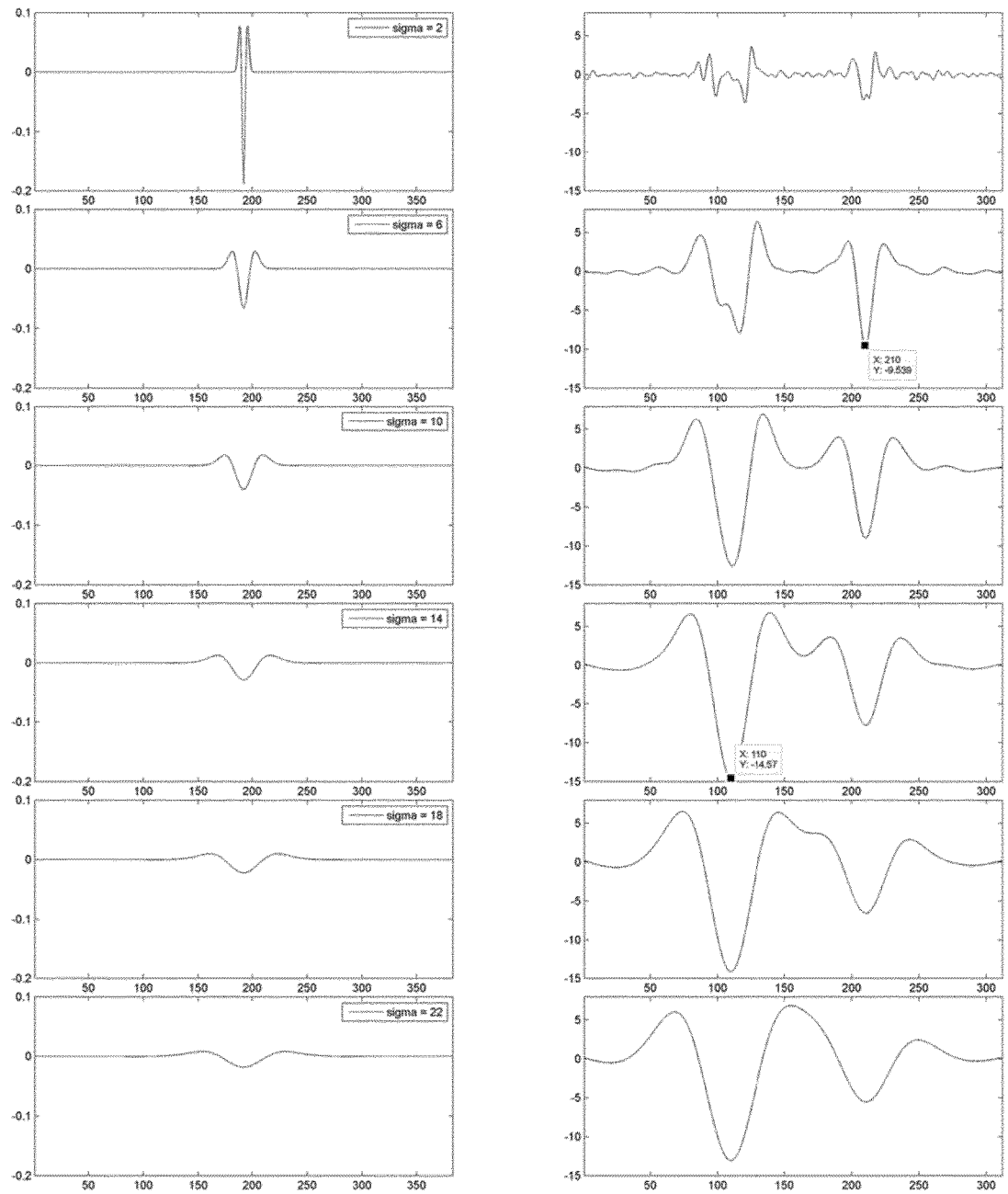
FIG. 1B shows, for different increasing values of $\sigma$, a corresponding LoG filter and the signal of FIG. 1A filtered through this LoG filter.
Figure 2A:
FIG. 2A shows a two-dimensional image, each point of which has a respective luminance value.
Figure 2B:
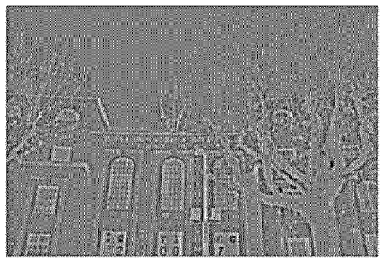
FIG. 2B shows, for increasing values of $\sigma$, a corresponding LoG filter and the image of FIG. 2A filtered through the LoG filter.
Figure 2B:
Figure 2B:
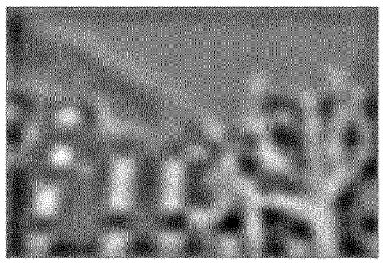
Figure 2B:
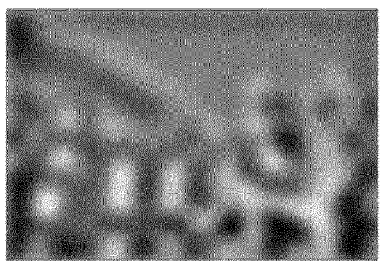
Figure 2B:
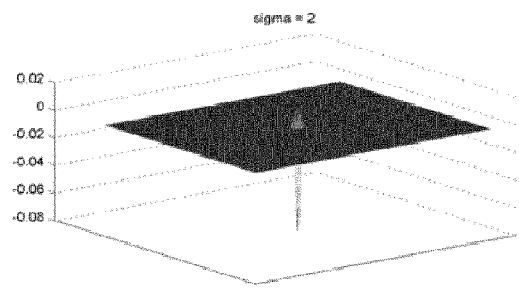
Figure 2B:
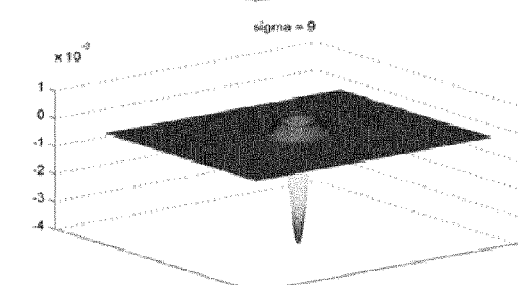
Figure 2B:
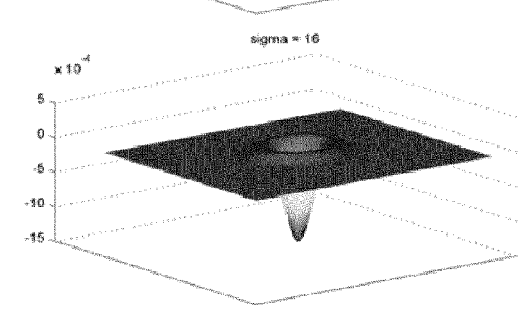
Figure 2B:
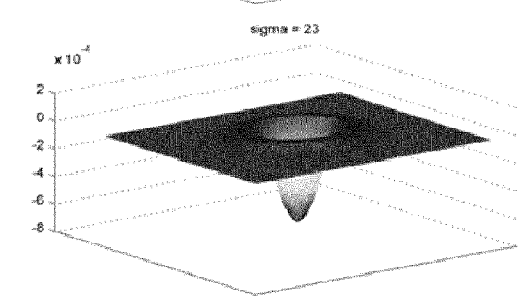

In order to show the mechanism which lies at the basis of the identification of salient details by means of LoG filtering application, two examples will now be presented: in the first example, illustrated in FIGS. 1A and 1B, for simplicity, instead of a two-dimensional image, it is considered a one-dimensional luminance signal, while the second example, shown in FIGS. 2A and 2B, refers to a two dimensional image.

Referring to the first example, FIG. 1A is a graph showing, as a function of a single x coordinate, a luminance value; observing the graph of FIG. 1A it is possible to already note the presence of two salient details, corresponding to the two peaks of the signal. To see how these two salient details can be identified by a LoG filtering procedure, which allows not only to identify the central coordinate, but also the size, reference will be made to FIG. 1B, which shows, for different increasing values of σ (σ=2, σ=6, σ=10, σ=14, σ=18, σ=22), a corresponding LoG filter (on the left in the figure) and the signal of FIG. 1A filtered through this LoG filter (on the right in the figure). In the example considered, two extremes can be identified, namely a first extreme at x=210 when σ=6, and a second extreme at x=110 when σ=14. These extremes indicate the presence of two salient details whose centers are at 210 and 110 points (or pixels if it were an image) and whose width is approximately 16.87 and 39.59 points, using the relation salient point diameter=2*sqrt(2)*σ.

Referring to the second example, FIG. 2A shows a two-dimensional image, each point of which has a respective luminance value, while FIG. 2B shows, for increasing values of σ (σ=2, σ=9, σ=16, σ=23), a corresponding LoG filter (on the right in the figure) and the image of FIG. 2A filtered through such LoG filter (on the left in the figure). The crescent-shaped window next to the word "SCUOLA" is a salient detail, with a distinct form easily detectable, having a height at the center of about 19 pixels. This means that in the middle of the window, the result of the LoG filter application to the image has a maximum value at a σ equal to 19/(2*sqrt(2))=6.46. In fact, it can be observed that in the center of the window, the highest value (the lightest) obtained as a result of the filtering is that which corresponds to the LoG filter having σ=9, i.e., the LoG filter of the four employed LoG filters having the σ value closer to 6.46.

Since a LoG filter tends to considerably increase in size as σ increases (with σ=50 the filter is representable with a matrix of almost 500×500 points), the processing described above can be performed advantageously by using an "octave" approach, in order to reduce the number of calculations. Octave processing is based on the observation that the result of a filter with σ=σ* on the original image can be reproduced with a filter with σ=σ*/2 on the image scaled to 50%. In octave processing, an interval is fixed for σ, filtered images are studied with some σ that fall in the range, and then the image is scaled to 50% by repeating the same type of analysis on the reduced image (performing the same filterings). The process is iterated until the scaled image has a size lower than a predetermined threshold. For example, starting from a VGA image (640×480) and stopping the process when the shorter side of the image is lower than 20 pixels, five octaves are obtained (640×480, 320×240, 160× 120, 80×60, 40×30).

One of the basic concepts of the solution in accordance with embodiments of the present invention stems from the observation that it is possible to approximate a LoG filter (x, y, σ) (where x, y are the spatial coordinates of the image (i.e., the points or pixels that form the image) and σ is the standard deviation of the Gaussian, with x, y, σ that define the scale-space) as a linear combination of n filters LoGB (x, y, $σ_i$) previously calculated with n different $σ=σ_i$ (i=1, 2, . . . , n), henceforth referred to as basic filters:

$$LoG(x,y,σ) \approx p_1(σ)LoGB(x,y,σ_1)+p_2(σ)LoGB(x,y,σ_2)+ p_3(σ)LoGB(x,y,σ_3)+ \ldots +p_n(σ)LoGB(x,y,σ_n), \quad (1)$$

where $p_1(σ), p_2(σ), \ldots, p_n(σ)$ are weights whose value is a function of σ, as will be shown later in this description. The spatial dependence from x and y has been omitted for simplicity.

Figure 3A:
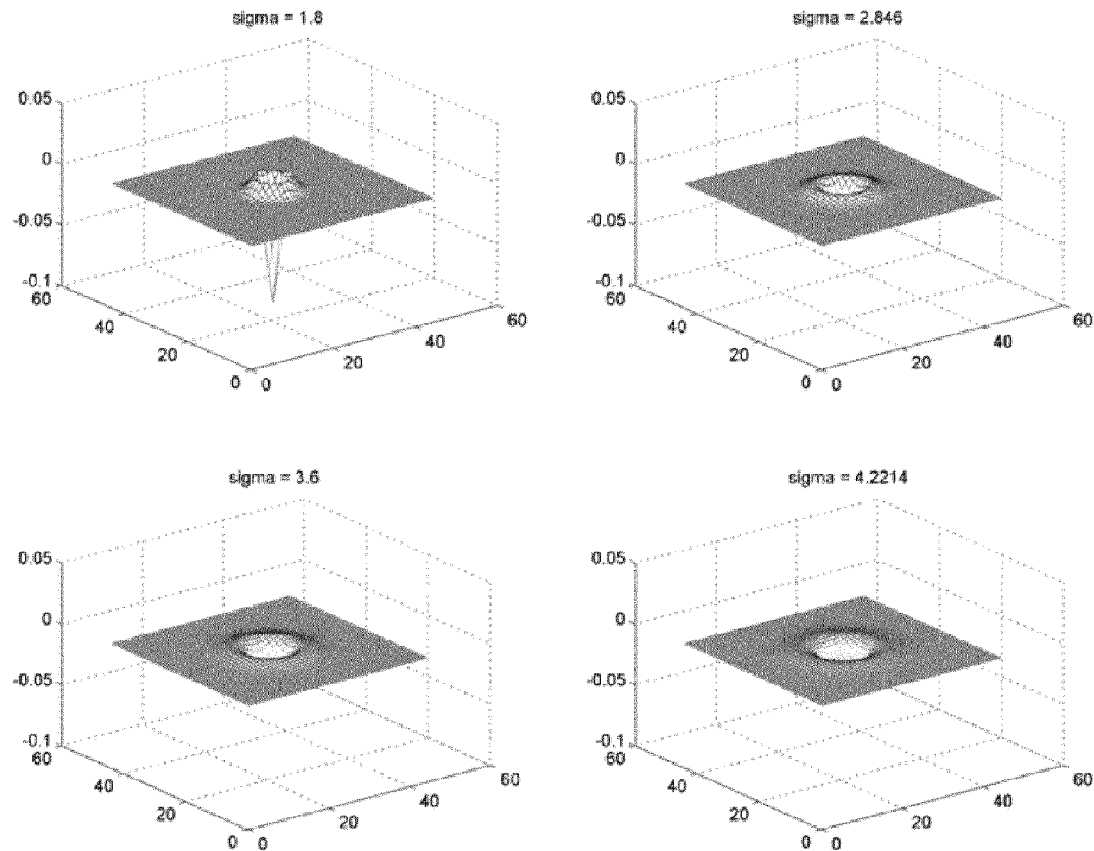
FIG. 3A illustrates four base filters LoGB.

Referring to the example shown in FIG. 3A, it is supposed to have calculated four base filters LoGB ($σ_1$), LoGB ($σ_2$), LoGB ($σ_3$), LoGB ($σ_4$) with $σ_1$=1.8, $σ_2$=2.846, $σ_3$=3.6, and $σ_4$=4.2214. Making a linear combination of these four base filters LoGB, it is possible to approximate the LoG filter as:

$$LoG(x,y,σ) \approx p_1(σ)LoGB(x,y,1.8)+P_2(σ)LoGB(x,y,2846)+P_3(σ)LoGB(x,y,3.6)+P_4(σ)LoGB(x,y,4.2214). \quad (2)$$

Using the relation (2), it is possible to obtain a good approximation of the LoG filter with σ equal to, for example, 2.5:

$$LoG(x,y,2.5) \approx 0.0161 \approx LoGB(x,y,1.8)+0.2501\ LoGB(x,y,2.846)-0.187\ LoGB(x,y,3.6)+0.0836\ LoGB(x,y,4.2214) \quad (3)$$

Figure 3B:
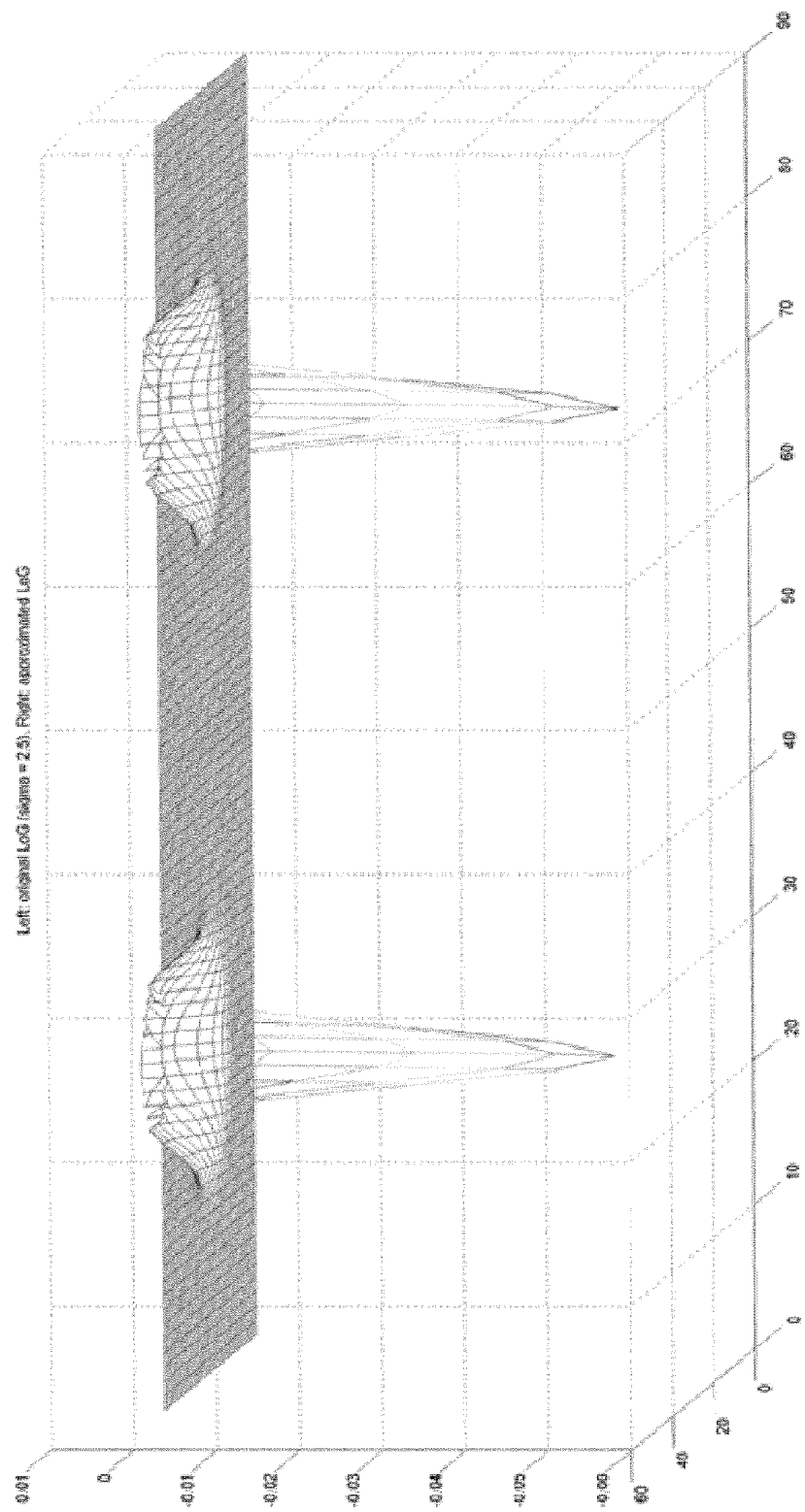
FIG. 3B shows how the LoG filter approximated by means of linear combination in accordance with one embodiment of the present invention is similar to that which has been explicitly calculated.

In FIG. 3B it is possible to observe how the LoG filter approximated by a linear combination (on the right in the figure) is similar to that calculated explicitly (on the left in the figure).

The weights $p_1(σ), p_2(σ), \ldots, p_n(σ)$ are calculated by solving the system of linear equations:

$$Ap=b, \quad (4)$$

where:

A is a matrix having a number of columns equal to the number n of base filters LoGB (in the example considered, four), in which each column represents a corresponding base filter LoGB. Assuming that the generic LoG filter is representable by means of a m×m square matrix (where each element corresponds to one pixel), each column of A is built by drawing up in columns the columns of the matrix of each base filter LoGB obtaining a corresponding column vector of $m^2$ elements.

b is the column vector of $m^2$ elements that represents the LoG filter to be approximated.

p is a vector of n elements containing the weights $p1(\sigma)$, $p2(\sigma), \ldots, p_n(\sigma)$ (in the example considered, $p_1$, $p_2$, $p_3$, $p_4$) that are determined by solving the system.

To solve the system, in accordance with an embodiment of the present invention it is possible to use the known least squares method or any other method that allows to reduce the norm of the difference between the observed and approximated values, as for example the method known as "simulated annealing" (in this regard, see, e.g., Kirkpatrick, S., Gelatt, C D, Vecchi, M P (1983)." Optimization by Simulated Annealing. "Science 220 (4598): 671-680).

By choosing a set of q LoG filters to be approximated having respective $\sigma=\sigma'_1, \sigma'_2, \ldots, \sigma'_q$, and based on the relation (4), it is possible to calculate a weight matrix W having a row for each of the n base filters LoGB and a column for each of the q LoG filters to approximate, and containing for each column the weights $p_1(\sigma), p_2(\sigma), \ldots, p_n(\sigma)$ to approximate the LoG filter corresponding to such column according to the following relationship:

$$AW=D, \quad (5)$$

where D is a matrix that contains the q LoG filters ($\sigma'_j$) (j=1, 2, . . . , q).

Interpolating for each one of the n base filters LoGB the corresponding elements of the weight matrix W is then possible to determine how the weights $p_1(\sigma), p_2(\sigma), \ldots, p_n(\sigma)$ vary with respect to $\sigma$. The precision with which the trend of the weights $p_1(\sigma), p_2(\sigma), \ldots, p_n(\sigma)$ is approximated with respect to $\sigma$ depends on the number q of LoG filters considered in relation (5) (the higher q, the better the approximation).

Figure 3C:
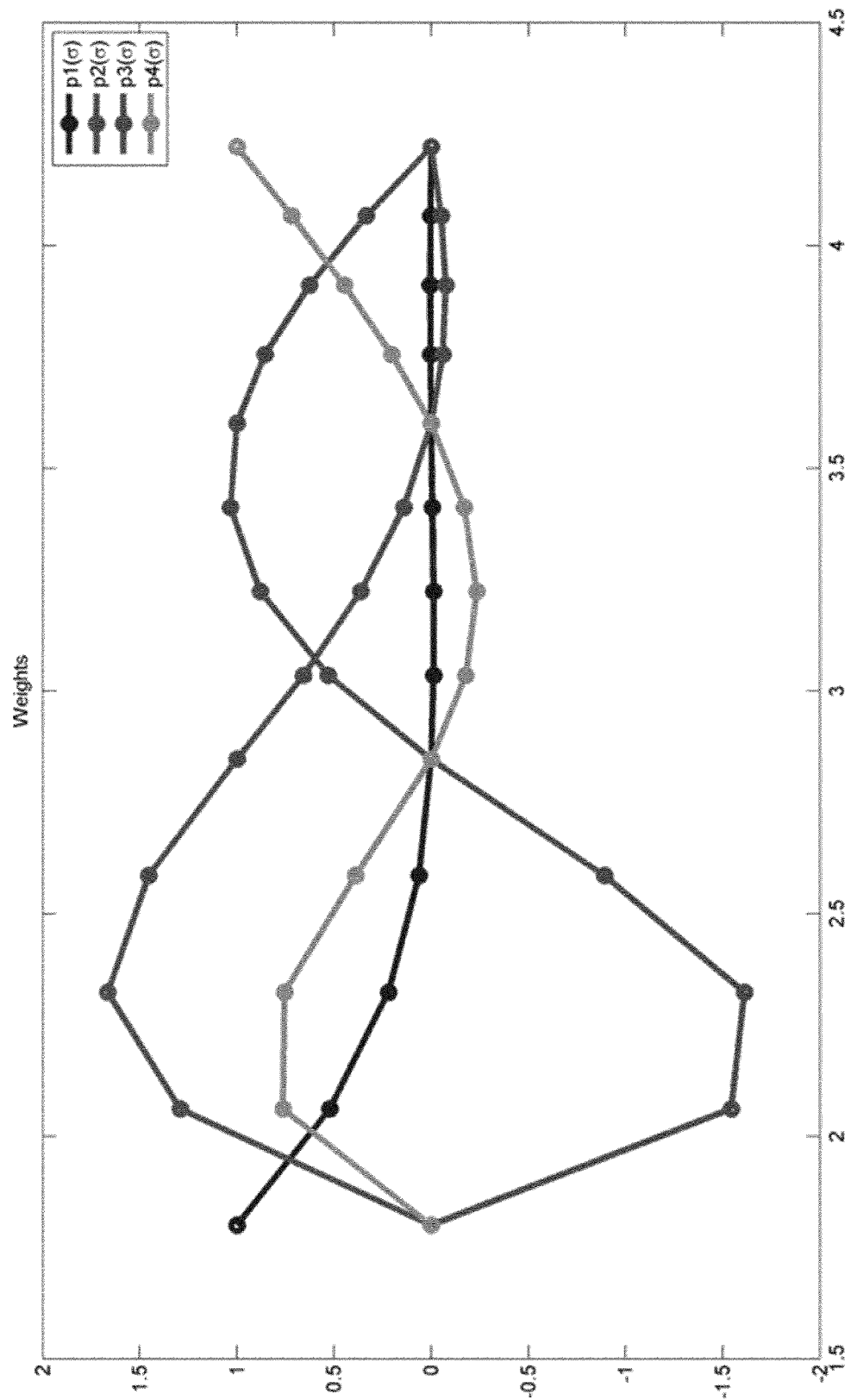
FIG. 3C illustrates a diagram showing how the weights of a linear combination of four base filters LoG vary in function of $\sigma$ to obtain a generic LoG filter.

FIG. 3C illustrates a diagram showing how to vary the weights $p_1(\sigma), p_2(\sigma), p_3(\sigma), p_4(\sigma)$ of the example considered earlier in function of $\sigma$. In this case, the curves were generated by interpolating for each weight 13 points each corresponding to 13 different $\sigma=\sigma'_1, \sigma'_2, \ldots, \sigma'_q$ (i.e., q=13).

In order to filter the image with a LoG($\sigma$) filter, the convolution of the LoG filter is performed with this image I:

$$L(\sigma)=LoG(\sigma)*I, \quad (6)$$

where L($\sigma$) is the result of the LoG filter applied to the image (henceforth, simply referred to as "filtered image") and * is the convolution symbol.

Since the convolution is a linear operator, by exploiting such property it is advantageously possible to obtain the approximation of any filtered image L($\sigma$) (i.e., for a filtering corresponding to any $\sigma$) without having to explicitly compute it. Indeed, by exploiting such property and substituting the relation (1) in relation (6), the following relation is obtained:

$$L(x,y,\sigma) \approx p_1(\sigma)L(x,y,\sigma_1)+p_2(\sigma)L(x,y,\sigma_2)+p_3(\sigma)L(x,y,\sigma_3)+ \ldots +p_n(\sigma)L(x,y,\sigma_n) \quad (7)$$

In other words, thanks to the solution in accordance with an embodiment of the present invention, it is sufficient to explicitly compute the filtering for a reduced number of times (i.e., n) to obtain n filtered images $L(\sigma_i)$ (i=1, 2, . . . , n) using the n base filters LoGB($\sigma_i$), and exploit the relation (7) to approximate the generic filtered image L($\sigma$) starting from these filtered images $L(\sigma_i)$.

To obtain an approximation to a filtered image L($\sigma$) is therefore sufficient to one-time calculate the weight matrix W that gives the value of the n weights $pi(\sigma)$ for a certain set of $\sigma$ sufficiently large (i.e., by considering a matrix D containing a sufficient number q of LoG filters) in order to meet the required precision needs.

The second basic concept of the solution in accordance with embodiments of the present invention provides for approximating the generic filtered image L($\sigma$) by means of a filtering approximation function that depends on a continuous set of values of $\sigma$.

In accordance with an embodiment of the present invention, the approximation function is a polynomial of degree r, although equivalent considerations apply in the case in which this approximation function is a different function, for example the function a log($\sigma$)+b$\sigma^2$+c$\sigma$+d. The choice of a polynomial is however advantageous in that the polynomials are easy to handle, since they are fast to calculate, readily derivable, and free of singularities.

In order to calculate the approximation function as a polynomial of degree r in accordance with one embodiment of the present invention, the weight matrix W is in turn approximated in the following way:

$$SF=W^T, \quad (8)$$

where S is the matrix of size q×(r+1):

$$S = \begin{bmatrix} (\sigma'_1)^r & \ldots & (\sigma'_1)^r & (\sigma'_1)^r & 1 \\ (\sigma'_1)^r & \ldots & (\sigma'_1)^r & (\sigma'_1)^r & 1 \\ (\sigma'_1)^r & \ldots & (\sigma'_1)^r & (\sigma'_1)^r & 1 \\ \vdots & \vdots & \vdots & \vdots & \vdots \\ (\sigma'_1)^r & \ldots & (\sigma'_1)^r & (\sigma'_1)^r & 1 \end{bmatrix}, \quad (9)$$

where the notation $(\sigma'_1)^r$ means "$\sigma'_1$ raised to r", and F is a matrix containing the values of approximation that serve to approximate, by polynomials of degree r in $\sigma'_1$, $\sigma'_2, \ldots, \sigma'_q$ the weights of the weight matrix W to be used to approximate the LoG filters having $\sigma=\sigma'_1, \sigma'_2, \ldots, \sigma'_q$, respectively. In greater detail, the approximation matrix F is a matrix of dimension (r+1)×n, where each column of F is used to make a linear combination of the columns of S. The matrix S multiplied by a i-th column F is a vector that approximates the weights contained in the i-th column of $W^T$. The generic element of the k-th column and the i-th row of F is the value that is used in the linear combination of the k-th column of S which corresponds to the $(\sigma'_i)^{(r-k+i)}$. In order to solve the system (8), in accordance with an embodiment of the present invention it is possible to use the known least squares method or any other method that allows to reduce the norm of the difference between observed and approximated values.

Substituting the relation (8) in (5), it is obtained:

$$AF^TS^T \approx D. \quad (10)$$

Thus, on the basis of the relationship (10), in accordance with an embodiment of the present invention it is possible to approximate a filter LoG($\sigma$) having any $\sigma$ making a linear combination of the values of base filters LoGB($\sigma_i$) contained in the matrix A by means of the multiplication with the matrix $F^T$, and using the result as coefficients of a polynomial of degree r in $\sigma$, as indicated below:

$$LoG(\sigma)(:) \approx AF^T \begin{bmatrix} \sigma^r \\ \vdots \\ \sigma^2 \\ \sigma \\ 1 \end{bmatrix}, \quad (11)$$

where (:) is a notation indicating that the matrix preceding the notation is transformed into a vector, obtained by the drawing up in columns the various columns of the matrix.

It should be noted that, given a base formed by the basic filters $LoGB(\sigma_i)$ contained in the matrix A, the matrix F is calculated only once, and used to approximate any filter $LoG(\sigma)$.

As done previously, using the linearity property of the convolution, and substituting the relationship (11) in relation (6), it is obtained:

$$[L(x, y, \sigma)(:) \approx L(x, y, \sigma_1)(:)L(x, y, \sigma_2)(:) \ldots L(x, y, \sigma_1)(:)] \quad (12)$$

$$F^T \begin{bmatrix} \sigma^r \\ \vdots \\ \sigma^2 \\ \sigma \\ 1 \end{bmatrix},$$

where $L(\sigma)$ represents a generic image filtered with a filter $LoG(\sigma)$, and $L(\sigma_i)$ (i=1, 2, ..., n) represent images filtered by means of the n base filters $LoGB(\sigma_i)$.

In other words, expanding the relationship (12), in accordance with one embodiment of the present invention, a generic filtered image $L(x, y, \sigma)$ can be approximated with the following approximation function:

$$L(x,y,\sigma) \approx c_r(x,y)\sigma^r + c_{(r-1)}(x,y)\sigma^{(r-1)} + \ldots + c_1(x,y)\sigma + c_0(x,y), \quad (13)$$

where the (r+1) coefficients $c_r, \ldots, c_0$ of the polynomial of the approximation function are functions of the filtered images $L(\sigma_i)$ (i=1, 2, ..., n) using the n base filters $LoGB(\sigma_i)$ and of the matrix F, and vary from pixel to pixel as a function of x and y coordinates. This approximation is valid in the interval (the ends of which are parameters that can be set) wherein $\sigma$ is varied within a single octave.

In accordance with one embodiment, the degree r of the polynomial of the approximation function is advantageously equal to 3, as it is found to be a good compromise between complexity of the calculations and precision in the approximation. Specifically, with r=3, the generic filtered image $L(x, y, \sigma)$ can be approximated with the following approximation function:

$$L(x,y,\sigma) \approx c_3(x,y)\sigma^3 + c_2(x,y)\sigma^2 + c_1(x,y)\sigma + c_0(x,y) \quad (14)$$

Figure 4A:
FIG. 4A shows the image of FIG. 2A filtered through a convolution with a filter LoG having a $\sigma$ equal to 2.5.
Figure 4B:
FIG. 4B shows the image of FIG. 2A filtered approximating the LoG filter with $\sigma$ equal to 2.5 by means of the approximation function in accordance with an embodiment of the present invention.
Figure 4C:
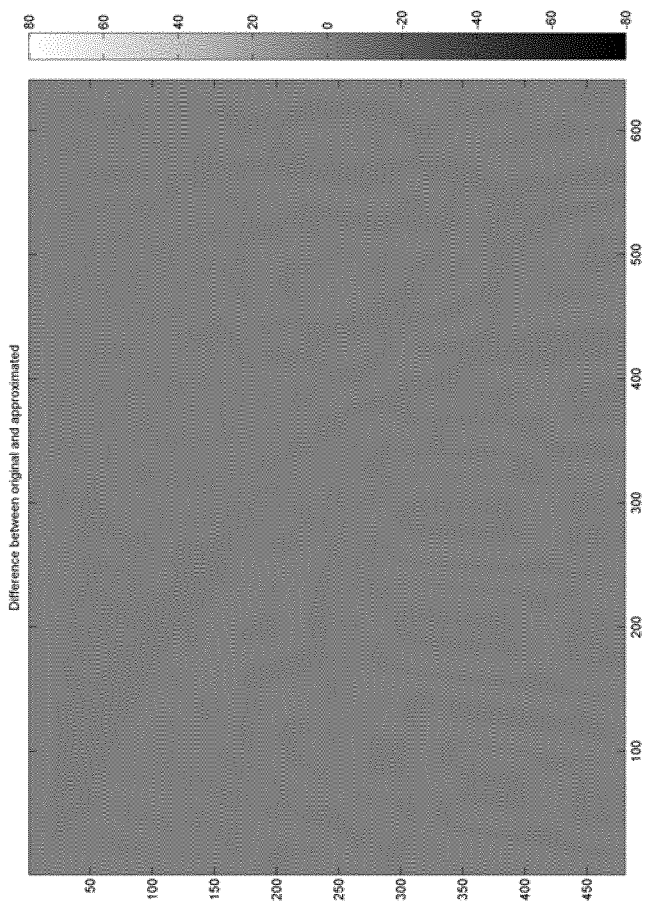
FIG. 4C is the image resulting from the difference between the image of FIG. 4A and the image of FIG. 4B.

To get an idea of the goodness of the approximation obtained by an approximation function as a third-degree polynomial, compare FIG. 4A, which displays the filtered image obtained from the image of FIG. 2A through a convolution with a LoG filter having a $\sigma$ equal to 2.5, with FIG. 4B, which represents the filtered image obtained from the same image of FIG. 2A by approximating the LoG filter with $\sigma$ equal to 2.5 by means of the approximation function (14) using four base filters $LoGB(\sigma_i)$ with $\sigma_i$=1.8, 2.846, 3.6, and 4, 2214. FIG. 4C is the image resulting from the difference between the image of FIG. 4A with the image of FIG. 4B. As can be seen by observing FIG. 4C, the difference between the image filtered by means of an explicit convolution with LoG (FIG. 4A) and the image filtered by means of the approximation function (14) (FIG. 4B) is close to zero.

As will be hereinafter described in detail, in accordance with one embodiment of the present invention, the tool of the approximation function just described is advantageously used to identify, in any digital image I, the set of keypoints to exploit for perform subsequent image analysis.

Figure 5A:
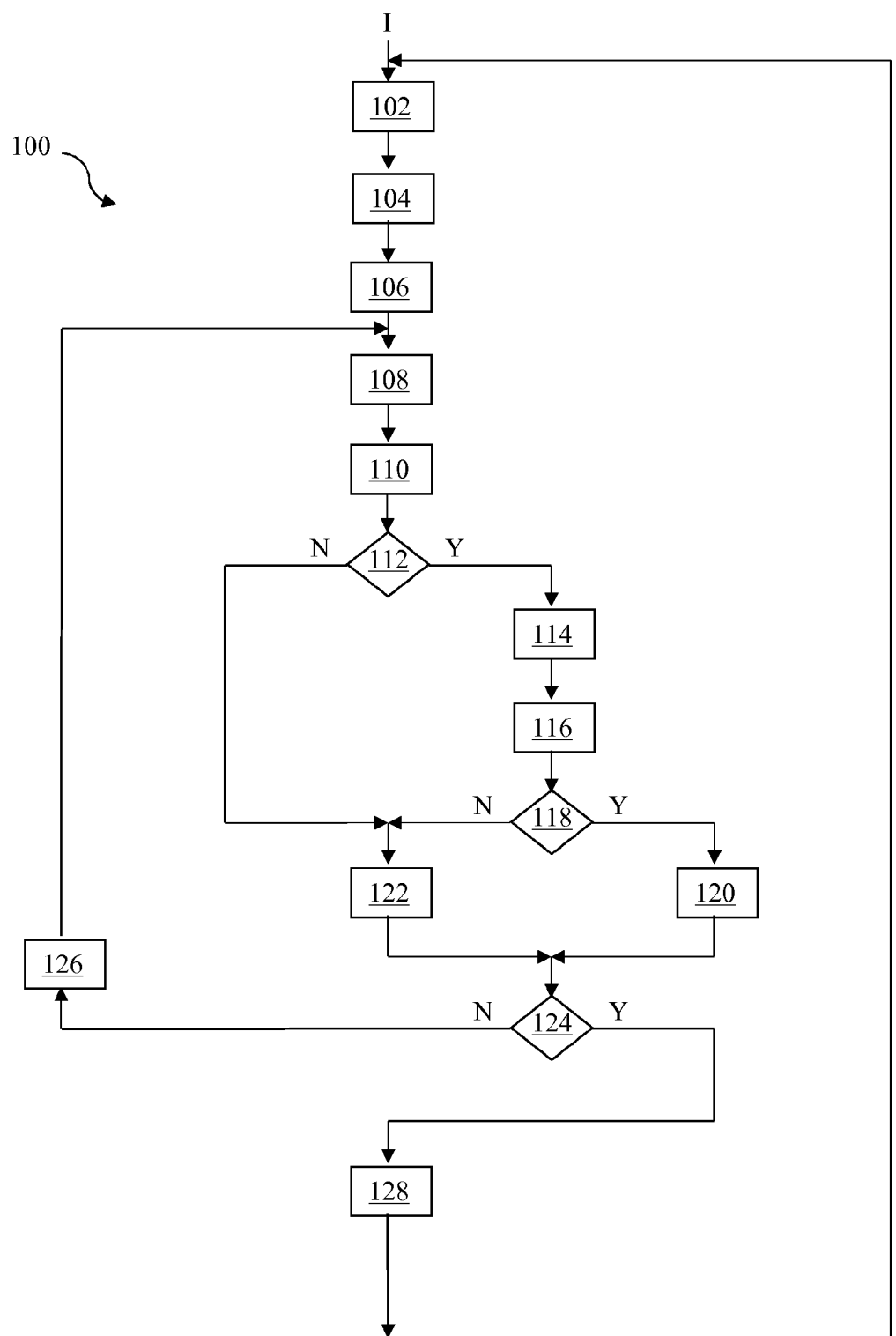
FIGS. 5A-5B show a flow diagram that illustrates in terms of functional blocks a process for identifying the keypoint of an image in accordance with an embodiment of the present invention.
Figure 5B:
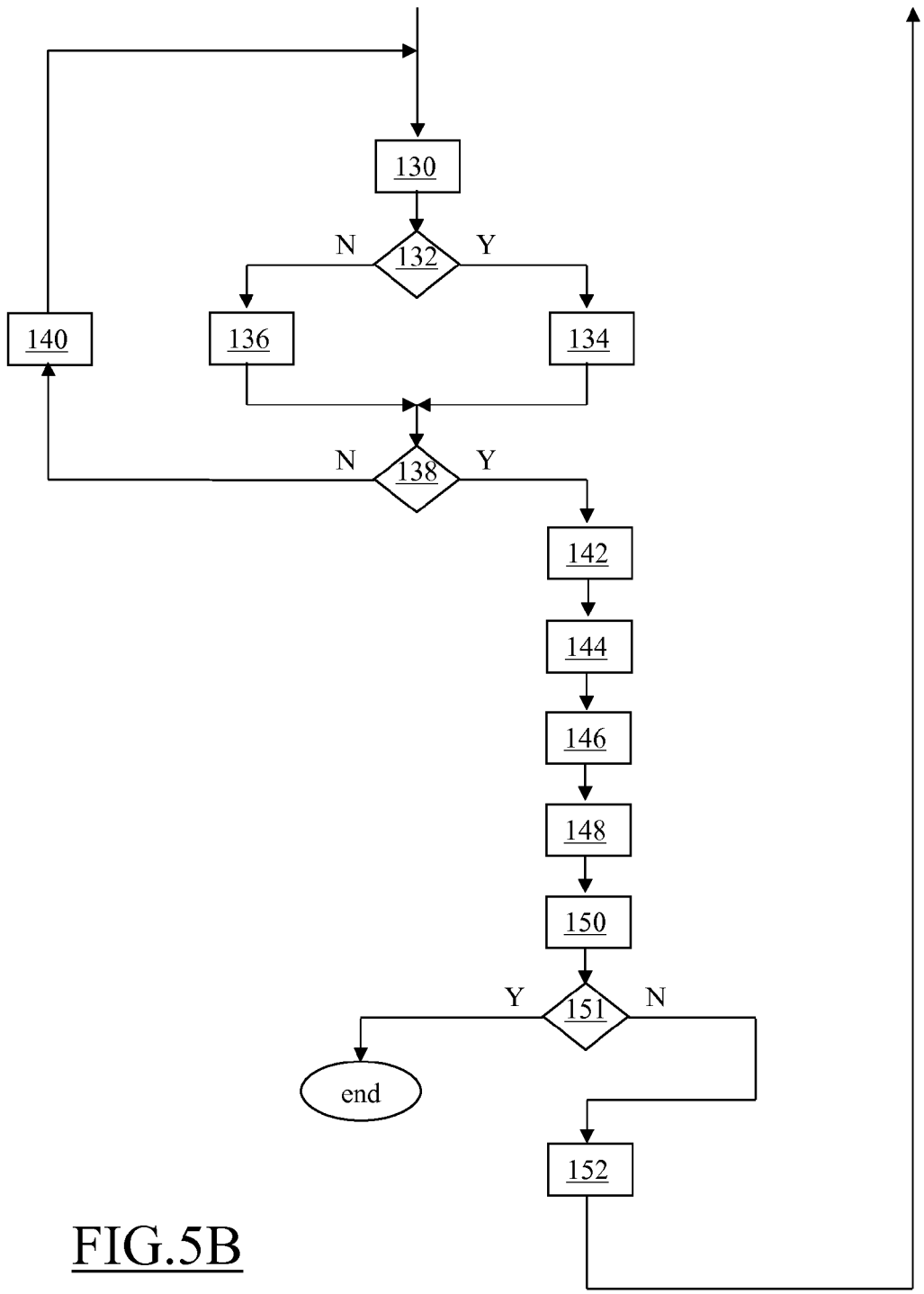

The process of identification of the keypoint of a digital image I in accordance with one embodiment of the present invention is illustrated in terms of functional blocks in the flowchart 100 shown in FIGS. 5A-5B.

Before moving on to describe in detail the functional blocks of this process, it is to be noted that the construction of the approximation function requires the use of the approximation matrix F (see relation (12)), which is advantageously calculated once, for example during a previous phase of training, and then used to approximate any filter $LoG(\sigma)$ applied to any image I. During this training phase, selecting a set of n base filters $LoGB(\sigma_i)$ (i=1, 2, ..., n), with $\sigma_i < \sigma_{i+1}$, and a set of q filters $LoG(\sigma'j)$ (j=1, 2, ..., q), and calculate the approximation matrix F as previously described (see relation (10)).

Turning now to FIGS. 5A-5B, the first phase of the process provides that, starting from a generic image I, the n corresponding images filtered by means of then base filters $LoGB(\sigma_i)$ are calculated, namely the $L(\sigma_i)$ (i=1, 2, ..., n) are calculated (block 102).

At this point (block 104), a work range in $\sigma$ is selected, where performing the following operations. As will become clear in the following description, selecting as lower end of the work range $\sigma_{i=1}$, and as upper end of the work range $\sigma_{i=n}$, it is possible to avoid making some calculations in the later stages of the process.

A point $(x_t, y_t)$ of the image I is then selected (block 106), such as the coordinating point ($x_t$=0, $y_t$=0), to perform on it operations relating to blocks 108-124.

The filtered image $L(x_t, y_t, \sigma)$ at the selected point $(x_t, y_t)$ is then approximated by calculating an approximation function (for example, a polynomial of degree r) using the relation (12) with x=$x_t$ and y=$y_t$ (block 108). For example, in the case of r=3, the filtered image $L(x_t, y_t, \sigma)$ is approximated by the following third-degree polynomial function of $\sigma$ (with coefficients that depend on $(x_t, y_t)$): $c_3(x_t, y_t)\sigma^3 + c_2(x_t, y_t)\sigma^2 + c_1(x_t, y_t)\sigma + c_0(x_t, y_t)$.

A necessary condition for a point in the image to be a keypoint is that that point has an extreme value in a portion of the scale-space $(x, y, \sigma)$ surrounding this point. In accordance with an embodiment of the present invention, thanks to the fact that the filtered images $L(x, y, \sigma)$ are approximated by an approximation function that depends on $\sigma$, determining if a point has an extreme value can be advantageously performed comparing the trend in $\sigma$ of the approximation function of this point with the trend in $\sigma$ of the approximation functions of the adjacent points.

For this reason, in the next step (block 110) the first derivative of the approximation function is calculated with respect to $\sigma$, and a check is made whether—and, in the affirmative case, where—this derivative assumes a value equal to zero in the considered $\sigma$ range (excluding the ends), in order to identify possible local maximum or minimum points. Using a polynomial as an approximation function, it is possible to easily calculate the derivative very quickly. Referring to the example considered, the first derivative of the filtered image at the point $(x_t, y_t)$ L $(x_t, y_t, \sigma)$ is equal to: $3c_3(x_t, y_t)\sigma^2 + 2c_2(x_t, y_t)\sigma + c_1(x_t, y_t)$.

If this first derivative assumes the value zero in at least one point $\sigma_m$ of the $\sigma$ range—excluding the ends of this range—(output branch Y of block 112), the process provides for calculating the value assumed by the approximation function at said at least one $\sigma_m$ (block 114) and comparing this value of the approximation function with the values assumed by the same approximation function in correspondence with the ends of the considered $\sigma$ range (block 116). If the $\sigma$ range determined in block 104 had as lower end $\sigma_i = 1$, and as upper end $\sigma_i = n$, it is not even necessary to have to calculate the values of the approximation function at the ends of the range, because these values have already been calculated (without approximation) in block 102 as filtered images L $(\sigma_1)$, L $(\sigma_n)$ through the filter base LoGB $(\sigma_1)$, LoGB $(\sigma_n)$.

Through the comparison performed in block 116, one can determine if $\sigma_m$ is also a global maximum (or minimum) point of the approximation function in the considered a range or if it is only a local maximum (or minimum) point.

If it is determined that $\sigma_m$ is a global maximum (or minimum) point approximation function with respect to $\sigma$ (output branch Y of block 118), then the corresponding selected point $(x_t, y_t)$ that has determined the values of the current coefficients $c_r, \ldots, c_0$ of the approximation function is a potential keypoint. In this case (block 120) the coordinates $(x_t, y_t)$ of the point, the value $\sigma_m$ and the value of the approximation function calculated for $\sigma_m$ are inserted in an element of a first table, identified as "potential keypoints" table. It should be noted that for each of the points belonging to the first table, it is also obtained an evaluation of the diameter of the salient detail associated with that point, equal to $2*\text{sqrt}(2)*\sigma_m$.

If instead it is determined that $\sigma_m$ is not a global maximum (or minimum) point of the approximation function with respect to $\sigma$ (output branch N of block 118), or in the case where the derivative of the approximation function does not assume the zero value in at least one point $\sigma_m$ in the $\sigma$ range—excluding the ends of this range—(output branch N of block 112), then the corresponding selected point $(x_t, y_t)$ which determined the values of the current coefficients $c_r, \ldots, c_0$ of the approximation function cannot be a potential keypoint. In this case, (block 122) the coordinates $(x_t, y_t)$ of the point and the value of the approximation function calculated for $\sigma_m$ are inserted in an element of a second table, identified as "discarded points" table.

In accordance with another embodiment of the present invention, in order that a point is considered a potential keypoint, and then that is inserted into the first table, the corresponding global maximum (or minimum) point $\sigma_m$ must further satisfy the condition of being included in a subset of the working range selected in block 104, with such subset having a lower end larger than $\sigma_i = 1$, and a upper end lower than $\sigma_i = n$. In this way, only the maximum or minimum points that happens in $\sigma_m$ of which the behavior of the approximation functions are known in a neighborhood of $\sigma_m$ that is sufficiently large, such as a neighborhood having a minimum size of about 0.1 (with respect to $\sigma$).

Also, in order to prevent the occurrence of artifacts that could compromise the correct identification of keypoints, the image points belonging to the border of the image are directly discarded—and therefore inserted into the second table—, regardless of the presence of possible global maximum (or minimum) points.

It should be noted that for each point of coordinates $(x_t, y_t)$ it is possible that there are more maximum and/or minimum points. In this case, in the case of maximum point, it can be considered only the point having the higher L$(x_t, y_t, \sigma)$ value, while in the case of minimum point, it can be considered only the point having the lower L$(x_t, y_t, \sigma)$ value.

In accordance with a further embodiment of the present invention, instead of using for each point the same working range in $\sigma$, it is possible to use a respective different working range. For example, a local maximum (or minimum) point of the approximation function can be considered as a global maximum (or minimum) with respect to a $\sigma$ range that is a sub interval of the working range comprising $\sigma_m$ and having ends dependent on $\sigma_m$. At this point a check is performed to determine whether the selected point $(x_t, y_t)$ is the last point of the image I or not (block 124).

In the negative case (output branch N of block 124) a new point $(x_t, y_t)$ of the image is selected (block 126), and the operations described above are repeated on the new point (return to block 108).

In the affirmative case (output branch Y of the block 124), all the points of the image are classified in the first or in the second table.

Figure 6A:
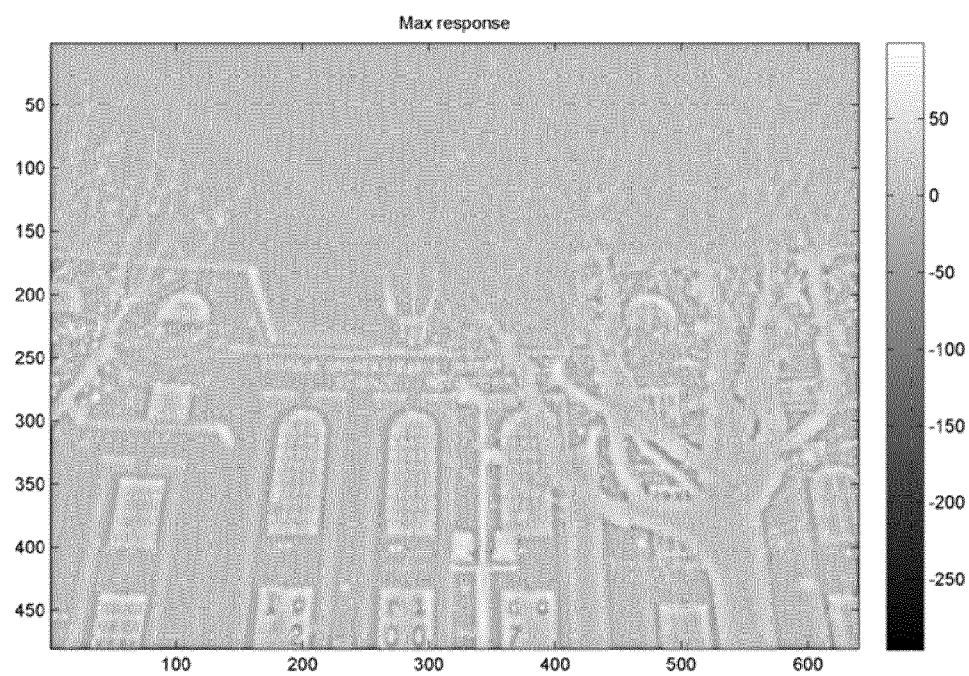
FIG. 6A shows, by means of a gray scale, an example of the maximum value assumed by the approximation function in accordance with an embodiment of the present invention for each point of the exemplary image of FIG. 2A.
Figure 6B:
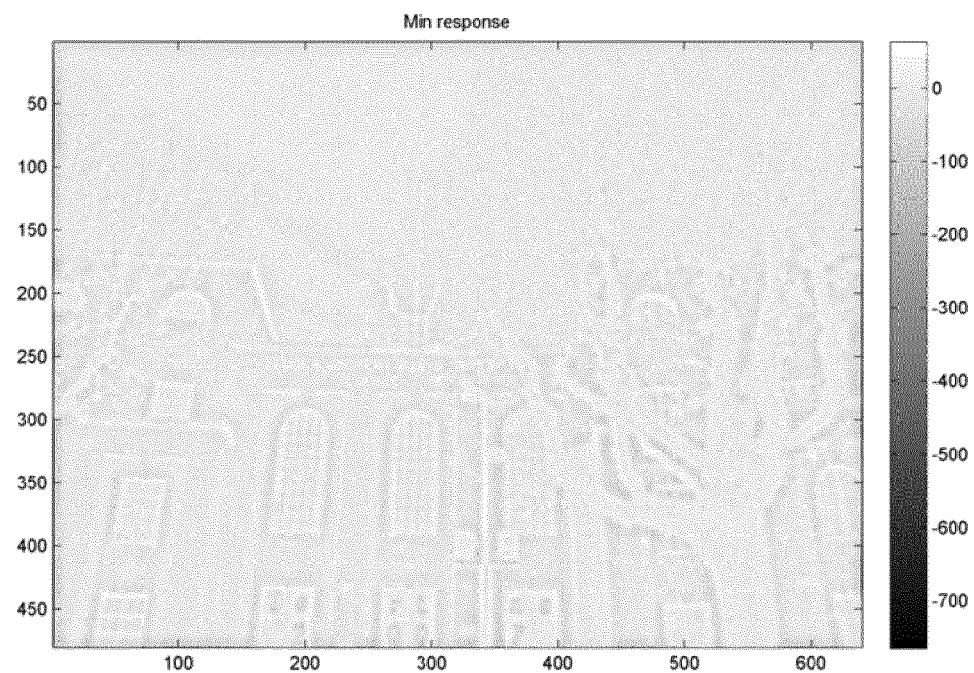
FIG. 6B shows, by means of a gray scale, an example of the minimum value assumed by the approximation function in accordance with an embodiment of the present invention for each point of the image of FIG. 2A.
Figure 6C:
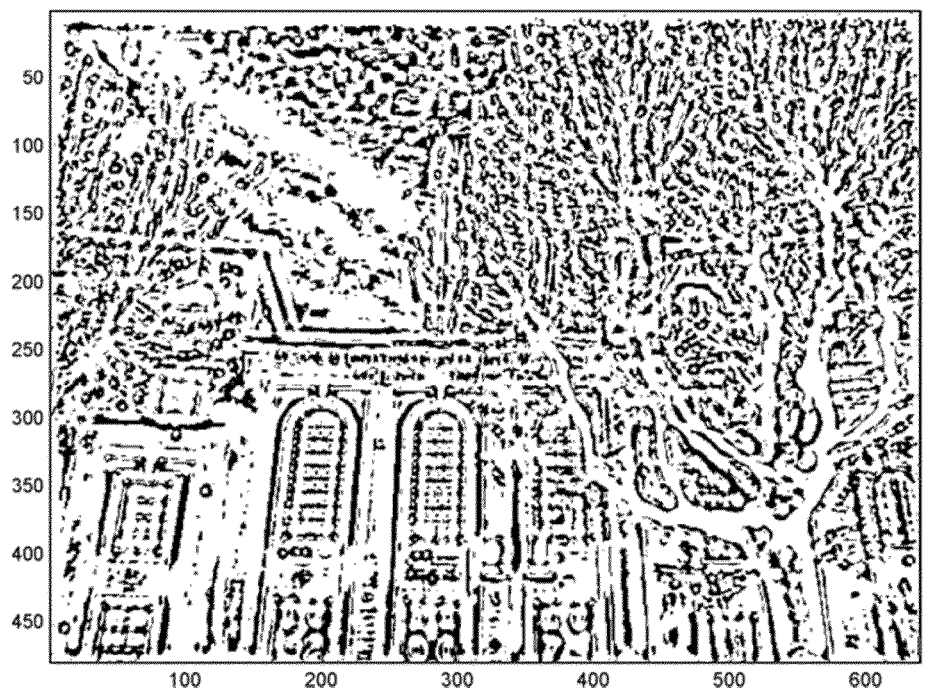
FIGS. 6C and 6D show an example of which of the points of the image of FIG. 2A are points of maximum and minimum, respectively, which are candidate to be potential keypoints.
Figure 6D:
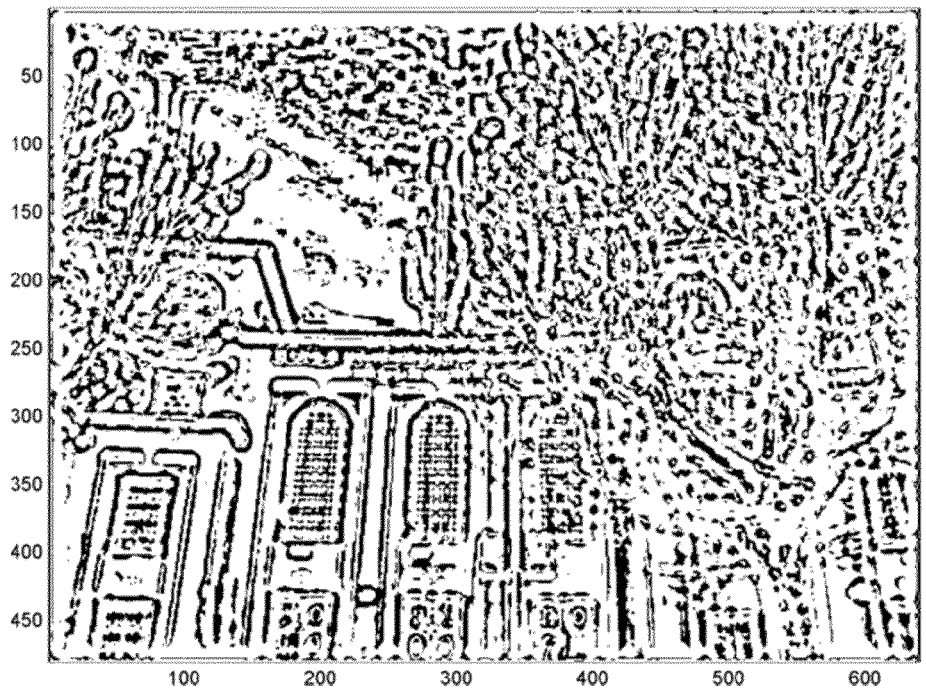
Figure 7A:
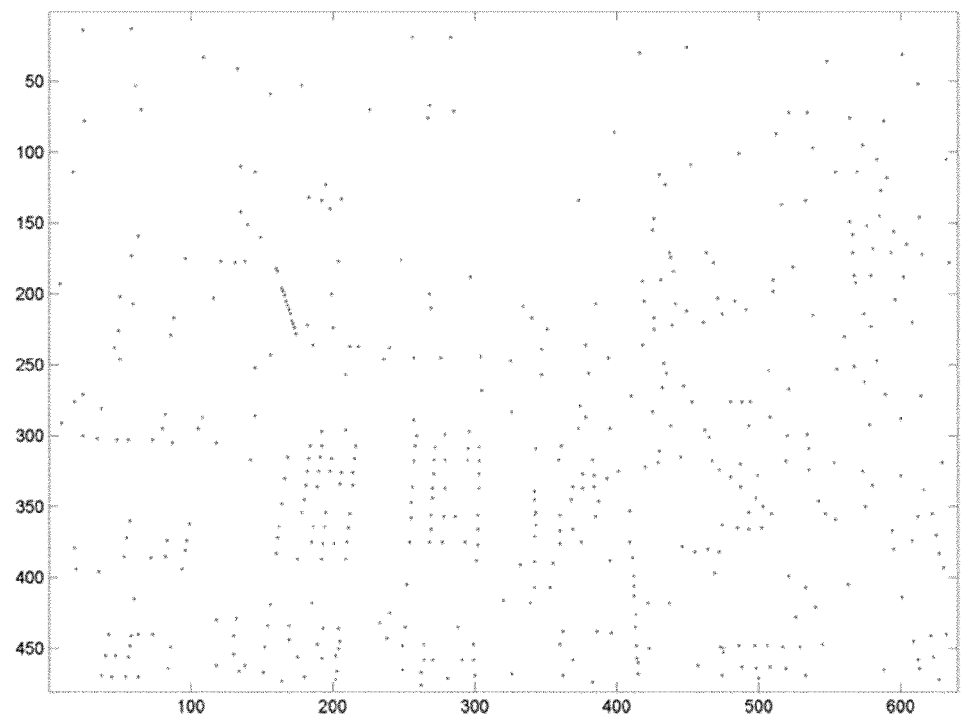
FIGS. 7A and 7B show, respectively, the corresponding points of maximum and minimum that are still considered potential keypoints after a procedure of comparison with the adjacent points has been carried out in accordance with an embodiment of the present invention.
Figure 7B:
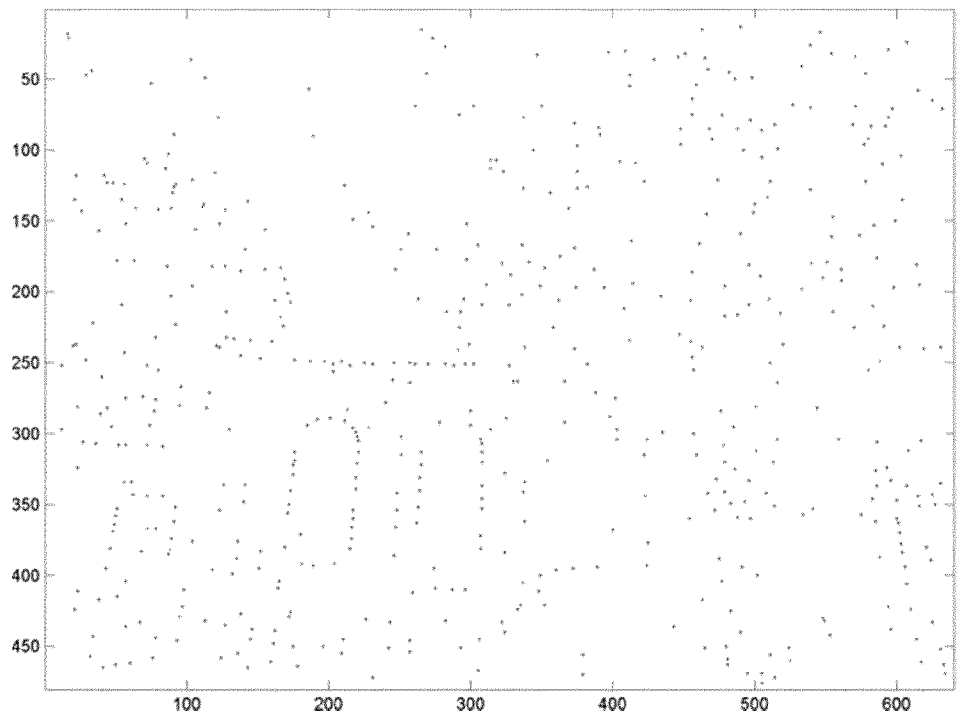

FIG. 6A shows, by means of a gray scale, an example of the maximum value assumed by the approximation function for each point of the image of the exemplary FIG. 2A, where a lighter color corresponds to a higher value. FIG. 6B shows, by means of a gray scale, an example of the minimum value assumed by the approximation function for each point of the image of FIG. 2A, where also in this case a lighter color corresponds to a higher value. FIGS. 6C and 6D show in black an example of which of the points of the image of FIG. 2A are the maximum and minimum points, respectively, that are candidate to be potential keypoints (i.e., points that were included in the first table).

In accordance with an embodiment of the present invention, the subsequent operations of the process of identification of the keypoints of FIGS. 5A-5B provide to verify, for each point $(x_t, y_t)$ of the image belonging to the first table having a maximum in the approximation function, if the value of the approximation function of said point at the value $\sigma_m$ of the identified maximum is also greater than the maximum values assumed by the approximation functions of the eight points adjacent to that point in the image. In a similar manner, for each point $(x_t, y_t)$ of the image belonging to the first table having a minimum in the approximation function, it is verified if the value of the approximation function of that point at the value $\sigma_m$ of the identified minimum is also lower than the minimum values assumed by the approximation functions of the eight points adjacent to that point in the image.

Considering the maximum points (similar considerations may also apply to minimum points), in accordance with one embodiment of the present invention a point $(x_t, y_t)$ is selected from the first table (block 128), and the maximum value of the approximation function of the point—obtainable from the corresponding element in the first table—is compared (block 130) with the maximum values of the approximation functions of the eight adjacent points in the image—obtainable by the elements corresponding to those adjacent points in the first and/or in second table. It is emphasized that each one of the eight adjacent points can be in turn a potential keypoint (in this case, the point is listed in the first table) or a point that has already been discarded (in this case, the point is listed in the second table). If the maximum value of the approximation function in the selected point appears to be greater than all the maximum values of the approximation functions of the adjacent points (output branch Y of block 132), then that point is still considered a potential keypoint, and therefore it is left in the first table (block 134). If the maximum value of the approximation function in the selected point is not greater than all the maximum values of the approximation function of the adjacent points (output branch N of block 132), then that point is no longer to be considered a potential keypoint, and therefore it is removed from the first table, and inserted in the second table (block 136). A check is then performed to determine if all the points listed in the first table have been compared or not. In the negative case (output branch N of block 138), a new point is selected from the first table (block 140), and the operations of blocks 132-136 are carried out again on this new point. In the positive case (output branch Y of block 138), the initial screening of potential keypoints has ended.

Using the solutions in accordance with the embodiments of the present invention, it was possible to evaluate in a fast and efficient way the behavior of the filtered image in a generic point of the image with respect to the behavior of the filtered image in the adjacent points, simply by comparing the trend of the approximation function of that point with the trend of the approximation functions of the adjacent points.

Returning to the example illustrated in FIGS. 6C and 6D, FIGS. 7A and 7B show in black color the corresponding maximum and minimum points, respectively, that have remained in the first table (i.e., which are still potential keypoint) after the procedure of the blocks 130-140 was carried out.

In accordance with an embodiment of the present invention, the remaining potential keypoints in the first table are henceforth considered independently from the fact that they are maximum or minimum points.

The keypoint identification procedure in accordance with an embodiment of the present invention further comprises removing from the first table of the potential keypoints those points reputed to have a poor stability, i.e., the keypoints that belong to elements of the scene that, observing the scene in a different way or with different lighting conditions, can change the position with respect to the object on which they lie, or cannot be detected anymore. In accordance with an embodiment of the present invention, the stability is determined by carrying out one or more of the following three stability tests.

The first stability test in accordance with one embodiment of the present invention (block 142) provides to discard from the first table the points with the absolute value of the approximation function calculated in the corresponding $\sigma_m$ lower than a certain threshold. These points belong to areas of the image with a contrast lower than a minimum contrast (determined by the threshold). This verification also allows to eliminate possible points that have been identified as keypoint only because of the approximation carried out by means of the approximation function. In practice, in correspondence of an area having a uniform color (thus an area with a very low contrast), the result of the filtering in a point belonging to said area as a varies should have values almost constant and close to zero, and therefore should have a flat trend, but the approximation exploiting the approximation function tends to generate (especially if the approximation function is a polynomial) local maximum or minimum close to zero only introduced by the approximation, which may allow the point to be classified as a keypoint instead to be discarded.

The second stability test in accordance with one embodiment of the present invention (block 144) provides for calculating for each point of the first table and in the patch of 3×3 pixels of the image centered at this point the main curvature and the secondary curvature (orthogonal to the first main curvature) of the surface formed by the function $L(x, y, \sigma)$ in the points belonging to that patch, and for comparing those two curvatures, calculating the ratio. If it appears that the two curves are similar, then it means that the point falls in an area of the image where its position is well defined, and the point is left in the first table, whereas if the two curves differ significantly then it means that the point falls in an area of the image similar to a board, and therefore not very reliable since its location or existence varies considerably depending on how the scene is observed. In this last case, the point is removed from the first table. This test is also used in the known procedures for the identification of the keypoints, but, unlike the latter, in which the patch of points used to calculate the curvatures belongs to an image already filtered, in accordance with embodiments of the present invention the patch is built at the moment by calculating the filtered image in the points at the $\sigma_m$ of the considered point, in order to have a more accurate picture of the surface, at the scale at which the detail really belongs.

The third stability test in accordance with one embodiment of the present invention (block 146), provides to calculate the value of the curvature (in $\sigma$) of the function $L(x, y, \sigma)$, given by the second derivative of the approximation function calculated in correspondence of $\sigma_m$ of the point. Referring to the example previously considered of approximation function corresponding to a third-degree polynomial, the curvature of the function $L(x_t, y_t, \sigma)$ at point $\sigma_m$ is equal to: $L''(x_t, y_t, \sigma_m) = 6c_3(x_t, y_t)\sigma_m + 2c_2(x_t, y_t)$. If the absolute value of the curvature is greater than a threshold, then the point is considered to be stable, and therefore is left in the first table. If the absolute value of the curvature turns out to be smaller than the threshold, then the point is considered to be unstable, and therefore is removed from the first table.

To reduce calculations, the process for identifying the keypoints is performed advantageously with the octave approach, i.e., by repeating all the operations described until now on versions of the image I that are more and more scaled, using always the same working range of $\sigma$.

For this reason, in accordance with one embodiment of the present invention, after performing the operations described up to now, a refinement of the coordinates of the points listed in the first table is carried out (block 148). Up to this point, in fact, the coordinates $(x_t, y_t)$ of each point listed in the first table correspond to the real and integer coordinates of the pixels of the original image I. If said refinement was not carried out, the coordinates of the points identified in the higher octaves, in which the image is scaled by half, by a quarter, by an eighth, and so on of the original size of the image, returned at full resolution, would cause the identification of keypoints that are not centered with the corresponding salient details. The refinement phase of the coordinates is directed to determine more precisely the center of the salient details.

In order to carry out this refinement, in accordance with an embodiment of the present invention an approach similar to the what has been exposed in the foregoing to approximate with an approximation function the filtered image at a point as $\sigma$ varies. In this case, what it is approximated is instead the filtered image as the spatial coordinates $x_t-u$ and $y_t-v$ vary in the neighborhood of the generic point $(x_t, y_t)$ listed in the first table, fixing a at the corresponding $\sigma_m$ value.

For example, in accordance with one embodiment of the present invention, the image filtered as x and y vary can be approximated by an approximation function, for example, a second degree polynomial in the two variables u and v:

$$L(x_t-u, y_t-v, \sigma) \approx l_5(x_t, y_t, \sigma)u^2 + l_4(x_t, y_t, \sigma)v^2 + l_3(x_t, y_t, \sigma)uv + l_2(x_t, y_t, \sigma)u + l_1(x_t, y_t, \sigma)v + l_0(x_t, y_t, \sigma)$$ (15)

In a way similar to that already described, the coefficients of the approximation function are calculated as a linear combination of some filtered images obtained by LoG filtering. For example, in accordance with an embodiment of the present invention, the coefficients are a combination of the filtered image in the 3×3 points centered at the point $(x_t, y_t)$, with σ at the value $\sigma_m$ (i.e., at the values of the patch used for calculating the ratio of the main and secondary curvatures). Generalizing, for obtaining the coefficients, an approximation matrix G is build in the same way of the approximation matrix F described above, and said matrix is multiplied by the LoG filters of the patch. The approximation function is then subjected to operations for the identification of maximum or minimum (depending on whether the point $(x_t, y_t)$ has been identified as a maximum or a minimum), corresponding to the point where the first derivative with respect to u and the first derivative with respect to v are equal to zero. Being the patch centered at the point $(x_t, y_t)$, the u and the v that solve the system given by imposing the first derivative with respect to u and the first derivative with respect to v equal to zero, provide the shift to be applied to the coordinates $(x_t, y_t)$. In accordance with an embodiment of the present invention, if the shift is calculated to be greater in absolute value of a pixel of the image at least along u or along v, then, the point is discarded from the first table. This last event is uncommon, but may still occur since the whole process of identification of the extremes in the scale-space (x, y, σ) happened firstly by working along σ, and then along x and y. In accordance with an embodiment of the present invention, provided to increase the calculations required and the complexity of the procedure, it would be possible to approximate the filtered image with a single function of x, y, and σ.

At this point, all the points that remain in the first table are identified as keypoints of the image I in the considered octave (block 150). For each keypoint, it is known both the position of it in the image (the coordinates $(x_t, y_t)$, possibly modified in accordance with the refinement phase of block 148), and the size of the associated salient detail (equal to $2*\text{sqrt}(2)*\sigma_m$).

Figure 8A:
FIG. 8A shows the points identified as keypoint in the first octave of the image in FIG. 2A.

FIG. 8A shows the points identified as keypoints in the first octave of the exemplary image shown in FIG. 2A. Each keypoint is identified with a circle centered on the position of the keypoint, and has a diameter proportional to the diameter of the associated salient detail.

Returning to FIGS. 5A-5B, at this point, it is verified if the octave considered up to now is the last one of a set of selected octaves (for example, five octaves). In the positive case (output branch Y of block 151), the process is finished, otherwise (output branch N of the block 151) a scaled version of the image is calculated (block 152) for passing to the next octave, and then the keypoint identification process is reiterated in the new octave (return to block 102). After having reiterated the process for a sufficient number of octaves (for example five), the keypoint identification process is terminated.

Figure 8B:
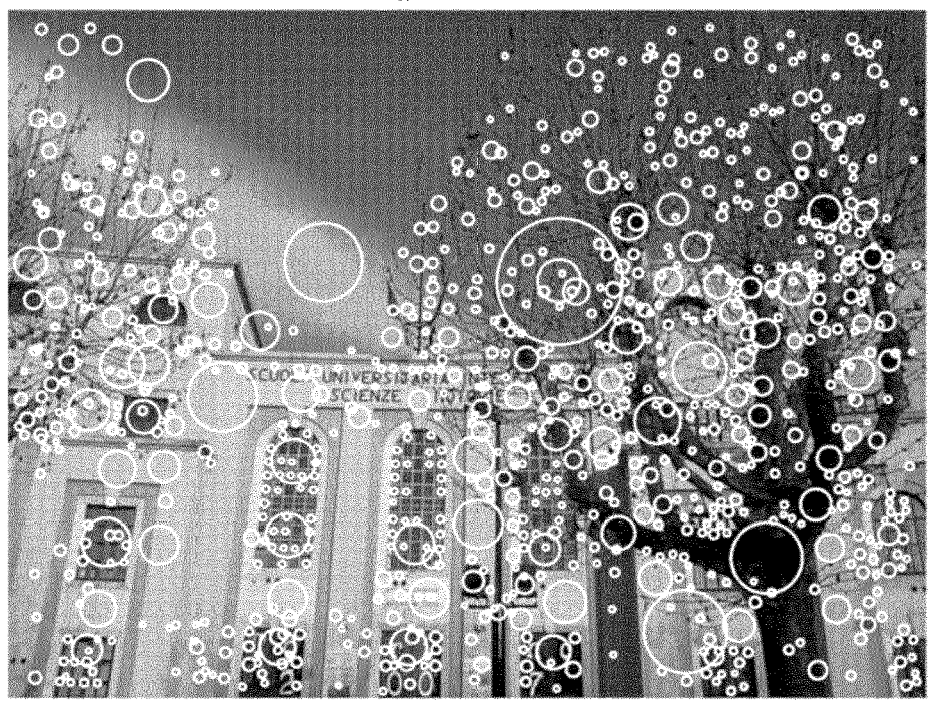
FIG. 8B shows the points identified as keypoint in five considered octaves of the image of FIG. 2A.

FIG. 8B shows the points identified as keypoint in all the considered octaves—in the considered example, five—of the sample image shown in FIG. 2A.

In accordance with an embodiment of the present invention, instead of directly calculating the scaled image corresponding to the next octave, the scaled version of the image may be approximated by choosing the $\sigma_i$ for the base filters $\text{LoGB}(\sigma_i)$ so that one of such $\sigma_i$ is equal to twice the first $\sigma_{i=1}$ (which is the lowest among the considered $\sigma_i$), and the filtered image may be under-sampled with such $\sigma_i$ that is twice $\sigma_1$ (taking a pixel every two both horizontally and vertically). In this way, it is obtained a good approximation of how the image scaled to 50% would result if filtered with the base filter LoGB ($\sigma_1$). With the under-sampling, it is therefore obtained the image of the next octave filtered with the first base filter LoGB ($\sigma_i$). The filtering of the image scaled to 50% corresponding to the generic base filter LoGB ($\sigma_i$) is obtained by filtering the image scaled to 50% filtered with the previous base filter LoGB ($\sigma_{i-1}$). The x, y coordinates and the scales σ of the keypoints extracted in the various octaves are subsequently reported to the size of the original image I.

The previous description shows and describes in detail various embodiments of the present invention; however, there are several possible modifications to the embodiments described, as well as different embodiments of the invention, without departing from the scope defined by the appended claims.

For example, although in the present description reference is made to a procedure for the identification of keypoint that plan to perform operations on all the image points (excluding the points on the edge of it), similar considerations may apply in the case in which only a subset of the points is subjected to such operations.

Furthermore, although in the description reference has been made to filters based on LoG or DoG, where the filtering parameter that determines the filtering intensity of such filters is the standard deviation of the Gaussian function, similar considerations apply in the case in which the filters are obtained on the basis of differences of smoothed versions of the image.

The invention claimed is:
1. A method for identifying keypoints in a digital image comprising a set of pixels, each pixel having associated thereto a respective value of an image representative parameter, said method comprising:
  approximating a filtered image, said filtered image depending on a filtering parameter and comprising for each pixel of the image a filtering function that depends on the filtering parameter to calculate a filtered value of the value of the representative parameter of the pixel, said approximating comprising:
  a) generating a set of base filtered images, each base filtered image being the image filtered with a respective value of the filtering parameter;
  b) for each pixel of at least a subset of said set of pixels, approximating the filtering function based on a respective approximation function based on the base filtered images, said approximation function being a function of the filtering parameter within a predefined range of the filtering parameter;
  for each pixel of said subset, identifying such pixel as a candidate keypoint if the approximation function has a local extreme which is also a global extreme with respect to the filtering parameter in a respective sub-range within said predefined range, the sub-range being less than the predefined range;
  for each pixel identified as a candidate keypoint:
  c) comparing the value assumed by the approximation function at the value of the filtering parameter corresponding to the global extreme of the pixel with the values assumed by the approximation functions of the adjacent pixels in the image at the values of the filtering parameters of the respective global extremes of such adjacent pixels, and d) selecting such pixel based on this comparison, wherein said filtered image is based on filtering said digital image with a filtering function that is based on a Gaussian function having a filtering parameter that is the standard deviation of the Gaussian function.

2. The method of claim 1, wherein said approximating the filtering function based on a respective approximation function based on the base filtered images comprises calculating said approximation function based on a linear combination of said base filtered images.

3. The method of claim 2, wherein said approximation function is based on a further approximation of said linear combination of said base filtered images.

4. The method of claim 3, wherein said approximation function is a polynomial having the filtering parameter as a variable.

5. The method of claim 4, wherein the coefficients of said polynomial are calculated based on the base filtered images and based on an approximation of weights of said linear combination.

6. The method of claim 1, further comprising discarding from the selected pixels the pixels wherein the value assumed by the approximation function at the filtering parameter corresponding to the global extreme of the pixel has an absolute value smaller than a first threshold.

7. The method of claim 1, further comprising:

for each selected pixel, calculating the main curvature and the secondary curvature of the surface formed by the filtering functions in the pixels of the image contained in a patch centered at such selected pixel;

discarding or maintaining such pixel from or in the selected pixels based on the ratio between the main curvature and the secondary curvature.

8. The method of claim 1, further comprising:

for each selected pixel, calculating the value assumed by the second derivative of the approximation function with respect to the filtering parameter at the corresponding global extreme, and discarding or maintaining such pixel from or in the selected pixels based on such value assumed by the second derivative.

9. The method of claim 1, wherein said identifying keypoint is further repeated on at least a scaled version of the image, using the same predefined range of the filtering parameter.

10. The method of claim 9, wherein:

at least one of the values of the filtering parameter of the base filtered images is equal to twice the lowest among the values of the filtering parameter of the other base filtered images;

said scaled version of the image is obtained by approximating the base filtered images starting from an approximate version of the base filtered image having the lowest value of the filtering parameter, said approximate version of the base filtered image being approximated by undersampling the base filtered image with such value of the filtering parameter that is twice the lowest value of the filtering parameter.

11. The method of claim 1, wherein said filtered image is further based on the application of filters based on Laplacian of Gaussians or filters based on Differences of Gaussians.

12. The method of claim 4, wherein said polynomial is a third degree polynomial with respect to the filtering parameter.

13. The method of claim 1, wherein each pixel of the image has at least one corresponding coordinate that identifies the location of the pixels in the image, said method further comprising for each selected pixel modifying said at least one coordinate of such pixel by calculating a corresponding change of coordinates based on a further approximation function that approximates the filtering function in the pixel with respect to such a change of coordinates, said further approximation function being based:

1) on the filtering function of such selected pixel at the value of the filtering parameter corresponding to the global extreme of the selected pixel, and 2) on the filtering functions of the pixels adjacent to the selected pixel in the image at the value of the filtering parameter corresponding to the global extreme of the selected pixel.

14. The method of claim 13, wherein said calculating the change of coordinates comprises identifying maximum or minimum points in the further approximation function with respect to the change of coordinates and setting such change of coordinates based on the identified maximum or minimum points.

* * * * *